United States Patent [19]

Gray et al.

[11] Patent Number: 5,317,148

[45] Date of Patent: May 31, 1994

[54] IR/LADAR SCANNER

[75] Inventors: Charles L. Gray, Akron; John T. Brooker, Mogadore, both of Ohio; Dale E. Bardin, San Diego, Calif.; E. Reeves Salby, II, Canton, Ohio

[73] Assignee: Loral Corporation, New York, N.Y.

[21] Appl. No.: 704,255

[22] Filed: May 22, 1991

[51] Int. Cl.⁵ .................... G02B 26/08; G02F 1/295; H01J 5/16
[52] U.S. Cl. .................. 250/227.26; 359/196; 385/4
[58] Field of Search ................... 250/227.26; 359/196, 359/197; 385/4, 6, 17

[56] References Cited

U.S. PATENT DOCUMENTS

| | | | |
|---|---|---|---|
| 3,449,587 | 6/1969 | Barnes | 250/227.26 |
| 3,941,927 | 3/1976 | Russell | 359/196 |
| 4,236,784 | 12/1980 | Palmer | 385/6 |
| 4,410,235 | 10/1983 | Klement et al. | 385/4 |

Primary Examiner—Stephen C. Buczinski
Attorney, Agent, or Firm—Renner, Kenner, Greive, Bobak, Taylor & Weber

[57] ABSTRACT

A scanner for implementation with ladar, and visual band passive IR systems. An optic fiber is positioned such that one end thereof is maintained at the focal point of a lens system. A permanent magnetic is attached to the optic fiber near that end, with the permanent magnet being positioned within a space subjected to varying magnetic fields induced by pairs of orthogonally positioned electromagnets. The end of the optic fiber scans the image of the lens, with the scanning pattern being controlled by the varying magnetic fields induced by the electromagnetic pairs. Another end of the optic fiber is connected through a coupler to an infrared/optic detector and a laser diode. The coupler allows for duplexing of light energy from the laser diode to the lens and for the receiving of light energy from the lens to the detector.

10 Claims, 1 Drawing Sheet

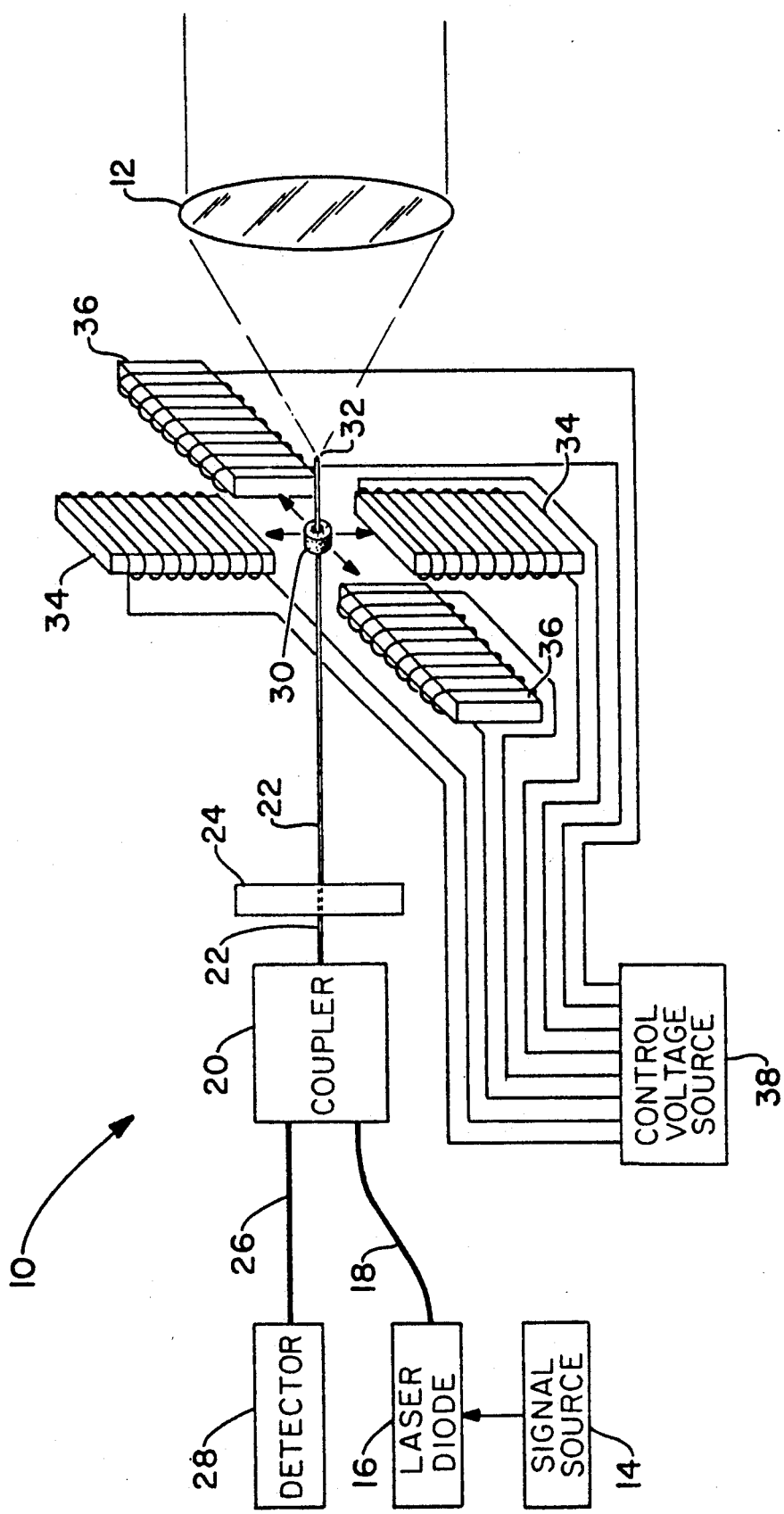

IR/LADAR SCANNER

Technical Field

The invention herein resides in the art of imaging systems of the ladar, passive infrared, or visible band type. More particularly, the invention relates to a scanner intended for implementation with such systems. Specifically, the invention relates to an electromagnetic scanner for ladar, passive infrared, and visual imaging systems.

Background Art

The use of imaging systems for target detection and/or location is quite well known. Many known systems employ radar, operating in the ultra high frequency range, or ladar, operating in the optical frequency range. The invention herein is particularly adapted for use in ladar systems in which optical frequency signals are radiated toward a target area and responses or reflections are sensed therefrom to detect the presence and/or of intended targets. In such systems, an optical lens system serves as a radiating and receiving antenna for the information carried by the optical frequency signals.

The invention herein also contemplates implementation with passive infrared (IR) or visible band systems in which the system provides no radiated energy, but receives and senses the characteristic radiation of the target in order to detect the presence of the target. As is well known to those skilled in the art, all objects have associated characteristic IR or visual frequency radiated or reflected energy facilitating the concept described.

In existing ladar and passive IR systems, complex lens systems and techniques for the operation thereof have been employed to radiate and sense the optical energy carrying the information of interest. Complex scanners are employed to scan the target area with optical energy and to receive the optical image reflected or radiated thereby. Prior ladar/IR scanners have employed motors and/or galvanometers to move or rotate assemblies of mirrors and prisms to scan the field of interest for both radiation and detection. Such systems and techniques have not only been structurally complex, but have also been expensive to manufacture and repair, while being sensitive to maladjustment.

Prior art ladar, passive IR, and visual systems have not capitalized on fiber optics. Indeed, the art has yet to see the benefit of such fibers as light conduits to direct energy for radiation onto a target or as a means for receiving energy reflected from the target. Such fiberoptics, now readily available, inexpensive, and highly reliable, provide a means for greatly simplifying such systems, while improving the accuracy and reliability and decreasing the size and weight thereof.

Presently, there is a need in the art for a simple, inexpensive, accurate, reliable, and durable scanner particularly for implementation with ladar and passive IR imaging systems. There is further need in the art for a scanner in such systems employing fiberoptics.

Disclosure of Invention

In light of the foregoing, it is a first aspect of the invention to provide a scanner or an imaging system which may be used with ladar, passive IR, and visual systems.

Another aspect of the invention is to provide a scanner for an imaging system which may be used with ladar, passive IR, and visual systems and which eliminates the need for mirrors, prisms, motors, or galvanometers.

Yet a further aspect of the invention is the provision of a scanner for an imaging system which may be used with ladar, passive IR, and visual systems which employs fiberoptics.

Still another aspect of the invention is the provision of a scanner for an imaging system for use with ladar, passive IR, and visual systems in which an electromagnetic drive may be used for controlling the scanning operation by the development of a varying electromagnetic field.

The foregoing and other aspects of the invention which will become apparent herein are attained by a scanner for an imaging system, comprising: a lens; an optical detector; an optic fiber interposed between said lens and optical detector providing for communication therebetween; and means operatively engaging said optic fiber for moving an end of said optic fiber with respect to said lens.

Still other aspects of the invention are attained by a scanner for an optical imaging system, comprising: a lens having a focal point; an optical detector; an optic fiber interposed between said lens and said optical detector, a first end of said optic fiber being at said focal point; a magnetic element attached to said optic fiber; and electromagnetic field generation means for receiving said magnetic element and generating a varying electromagnetic field for deflecting and attracting said magnetic element to move said end of said optic fiber through said focal point of said lens.

DESCRIPTION OF DRAWING

For a complete understanding of the objects, techniques and structure of the invention reference should be made to the following detailed description and accompanying drawing wherein a schematic diagram of the ladar/IR scanner of the invention may be seen.

BEST MODE FOR CARRYING OUT THE INVENTION

Referring now to the drawing, it can be seen that a scanner for an imaging system according to the invention is designated generally by the numeral 10. A lens or lens system 12 is provided for radiating and/or receiving optical energy. To this end, the lens system 12 operates as an antenna which, in a ladar system serves the dual function of radiating optical energy toward the target and receiving the optical energy reflected therefrom. In a passive IR or visual system, the lens system 12 simply operates to receive the IR or visual band energy naturally reflected or radiated from the target area.

A signal source 14 is provided for implementation with a ladar system to provide the output signal to be radiated from the system 10 to the target area. As is well known to those skilled in the art, the signal source 14 will typically produce bursts of pulses, or an appropriately modulated signal. The output of the signal source 14, in this embodiment, is applied to a laser diode 16 through which the electrical output signals from the source 14 are converted to light energy to be transmitted by means of the optical fiber 18 to an appropriate optic coupler 20. The signals from the laser diode 16, received by the optic coupler 20, are coupled to the optic fiber 22 which ultimately communicates with the lens 12. The optic fiber 22 is physically supported by an appropriate support plate 24 or the like, as shown.

Also connected to the optical coupler 20 is an optic fiber 26 which communicates with the detector 28. It should now be readily appreciated that optical energy generated by the signal source 14 and laser diode 16 may be coupled from the optic fiber 18 to the optic fiber 22 by means of the optic coupler 20. This outgoing energy may be passed to the lens system 12 for appropriate radiation to a target area. The coupler 20 also provides for receipt of data received from the lens system 12 by the optic fiber 22 and coupled to the optic fiber 26 for receipt by the detector 28. Accordingly, the optic coupler 20 serves to duplex the operation of the optic fiber 22, providing for both the sending and receiving of optic energy information. Such duplexing is, of course, well know to those skilled in the art.

As an important feature of the invention, a magnetic element 30, such as an iron piece or a small permanent magnet, is fixedly attached to the optic fiber 22 adjacent to the end 32 thereof, as shown. The end 32 of the optic fiber 22 is preferably positioned at the focal point of the lens system 12 such that optical information from the optic fiber 22 may be passed to the lens system 12 or, in the receiving mode, optical information from the lens 12 may be passed to the optic fiber 22.

A first pair of electromagnets 34 is positioned such that the permanent magnet 30 attached to the optic fiber 22 is positioned between each of the electromagnets of the pair. In like manner, a second pair of electromagnets 36 is positioned with respect to the permanent magnet 30 such that the permanent magnet 30 is interposed between the pair. As shown, the pairs of electromagnets 34, 36 are orthogonal to each other and are provided such that they are spaced at 90° intervals about the permanent magnet 30 which is positioned in a space provided therebetween. Those skilled in the art will readily recognize that the pair of electromagnets 36 could indeed comprise a single electromagnet having its poles positioned opposite each other with the permanent magnet 30 therebetween. The same is true of the pair of electromagnets 34.

It should be appreciated that the orthogonal arrangement of the electromagnetic pair 34, 36 with respect to each other allows one such pair to move the permanent magnetic 30 by deflection or attraction in a direction of elevation, while the other electromagnetic pair 36 allows movement of the permanent magnet 30 along the azimuth. Accordingly, the exact positioning of the magnet 30 and, accordingly, the end 32 of the optic fiber 22 may be determined by the exact nature of the magnetic fields generated by the electromagnet pairs 34, 36 within the space therebetween. By providing a varying electromagnetic field, the permanent magnet 30 may be caused to move within that space, correspondingly moving the end 32 of the optic fiber 22. Accordingly, the end 32 may be caused to scan the lens 12 in various patterns, dependent upon the varying nature of the magnetic field exerted onto the permanent magnetic 30 by the electromagnetic pairs 34, 36. Such scanning pattern may be employed for both sending or radiating light energy to a target area or receiving such energy from the target area.

In order to control the magnetic field generated by the electromagnetic pairs 34, 36, a control voltage source 38 is provided. As shown, the control voltage source 38 interconnects with each of the electromagnets, of the electromagnet pairs 34, 36. By controlling the voltage to each of the magnets, the exact position of the permanent magnetic 30 may be controlled, with resultant control of the end 32 of the optic fiber 22. By controlling the voltage of the source 38, the scan pattern of the optic fiber 32 with respect to the lens system 12 may be controlled, recalling that the end 32 of the optic fiber 22 is at the focal point of the lens system 12. For example, a simple raster scan may be devised by the application of appropriately timed and scaled sawtooth and/or sine wave signals to the electromagnetic assemblies. A single set of electromagnets and single axis scanning can, of course, be useful in certain applications.

With an understanding of the structure of the invention as presented above, an appreciation of the operation of the invention can now be attained. When used as a passive IR system, the signal source 14, laser diode 16, and the optical coupler 20 are not used. The lens system 12 simply focuses upon a target area and radiated infrared energy therefrom may be scanned by movement of the end 32 of the optic fiber 22 through the focal point of the lens 12. Such movement is facilited by control of the electromagnetic fields generated by the electromagnet pairs 34, 36, the same operating upon the permanent magnetic or magnetic piece 30. The light energy sensed is passed by the optic fiber 22 to the IR or optic detector 28 for appropriate processing.

When the system 10 is employed in the ladar mode, electrical signals 14 are converted by the laser diode 16 to light energy which is passed through the optic fiber 18 and optic coupler 20 to the optic fiber 22. The radiation of that energy on the target is controlled by the scanning pattern generated by the control voltage source 38 through interconnection with the electromagnetic pairs 34, 36. In the receiving mode, seeking to receive the energy reflected or radiated back from the target area in response to the radiation just described, the system can operate as presented above with respect to a passive IR or visual band system. It will, of course, be appreciated that the optic coupler 10 provides for the duplexing of the optic fiber 22, allowing it to both send and receive optical energy data, such data being sent by the laser diode 16, and received by the IR or optic detector 28.

It will be appreciated that the system 10 has been described with respect to the implementation of an optic fiber 22 interconnected with optic fibers 18 and 26 through the optic coupler 20. Those skilled in the art will readily appreciate that the optic fiber 22 could be readily replaced by a bundle of optic fibers, arranged in a particular linear, matrix, or other appropriate pattern. In like manner, the optic fiber 18 may be replaced with a bundle of fibers, as could the optic fiber 26. For purposes of simplicity in depicting the invention, it has been described with respect to singular optic fibers. The implementation of bundles of fibers, each emitting and/or receiving optical ladar energy data, allows for enhancement of multiple channels of information, multiple ladar/IR bands, and operational speed. Such is, of course, considered within the scope of the instant invention.

It can also be appreciated that there are multiple mechanical or electromagnetic means to implement the concept of this fiberoptic scanning invention. Those skilled in the art will readily appreciate that the optic fiber 22 could be mechanically captivated and positioned in a moving assembly which is positioned or scanned by means of a solenoid or solenoids. Other types of electromechanical positioners may also be employed. The use of an encoder to monitor the position of the optic fiber, thereby providing information as to the position of the fiber for imaging purposes and/or as part of a feedback loop for more precisely positioning or scanning the optic fiber can also be readily appreciated. All such refinements are contemplated as a part of this invention.

Those skilled in the art will further understand and appreciate that in certain applications, involving short ranges of distances, the lens system 12 is not required. In other applications, no lens, or a small lens at the end of the optic fiber, may be useful. The presence, absence, or variation of the lens is deemed a portion of the invention as well.

Thus it can be seen that the objects of the invention have been satisfied by the structure presented above. While in accordance with the patent statutes only the best mode and preferred embodiment of the invention has been presented and described in detail, it is to be understood that the invention is not limited thereto or thereby. Accordingly, for an appreciation of the true scope and breadth of the invention reference should be made to the following claims.

What is claimed is:

1. A scanner for an imaging system, comprising:
   an optical detector;
   an optic fiber communicating with said optical detector;
   means operatively engaging said optic fiber for moving an end of said optic fiber;
   a lens communicating with said optic fiber, said optic fiber being interposed between said optical detector and lens, said end of said optic fiber being moved through a focal point of said lens;
   a light energy source interconnected with said optic fiber and in communication with said lens, said lens radiating light energy from said light energy source; and
   an optic coupler interposed within said optic fiber, said optic coupler interconnecting said optical detector and said light energy source to said lens, said optic coupler duplexing said optic fiber to pass light energy from said light energy source to said lens and from said lens to said detector.

2. The scanner according to claim 1, wherein said means positions said optic fiber imaging.

3. The scanner according to claim 2, wherein said means comprises a pair of electromagnetic assemblies and said optic fiber has an element reactive to magnetic fields attached thereto and positioned within magnetic fields generated by said electromagnetic assemblies.

4. The scanner according to claim 3, wherein said pair of electromagnetic assemblies are orthogonal to each other and spaced from each other.

5. The scanner according to claim 4, wherein said element comprises a permanent magnet maintained within a space between said electromagnetic assemblies within said magnetic fields.

6. The scanner according to claim 5, wherein each of said electromagnetic assemblies comprises a pair of longitudinally aligned spaced apart electromagnets.

7. A scanner for an optic imaging system, comprising:
   a lens having a focal point;
   an optical detector;
   an optic fiber interposed between said lens and said optical detector, a first end of said optic fiber being at said focal point;
   a magnetic element attached to said optic fiber;
   electromagnetic field generation means for indexing said magnetic element and generating a varying electromagnetic field for deflecting and attracting said magnetic element to move said first end of said optic fiber through said focal point of said lens;
   a source of light energy interconnected to said optic fiber;
   an optic coupler within said optic fiber interposed between said optical detector and source of light energy for duplexing said lens to said optical detector and said source of light energy; and
   a control voltage source interconnected with said electromagnetic field generating means for generating control signals for controlling movement of said first end of said optic fiber, said pair of electromagnetic assemblies controlling said movement in respective orthogonal directions.

8. The scanner according to claim 7, wherein said magnetic element comprises a permanent magnet.

9. The scanner according to claim 7, wherein said electromagnetic field generation means comprises a pair of electromagnetic assemblies orthogonally positioned with respect to each other.

10. The scanner according to claim 9, wherein said magnetic element is maintained within a space between said electromagnetic assemblies.

* * * * *